(12) United States Patent
Tsuda

(10) Patent No.: US 6,474,381 B1
(45) Date of Patent: Nov. 5, 2002

(54) PNEUMATIC TIRE INCLUDING AXIAL GROOVES

(75) Inventor: Satoshi Tsuda, Akashi (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 32 days.

(21) Appl. No.: 09/626,422

(22) Filed: Jul. 26, 2000

(30) Foreign Application Priority Data

Jul. 26, 1999 (JP) .......................................... 11-210956

(51) Int. Cl.[7] .......................... B60C 11/11; B60C 11/13; B60C 103/00; B60C 107/00
(52) U.S. Cl. .................................. 152/209.24; 152/902
(58) Field of Search ...................... 152/209.15, 209.18, 152/209.24, 902

(56) References Cited

U.S. PATENT DOCUMENTS 5,417,268 A * 5/1995 Kishi
5,450,885 A * 9/1995 Hanya
6,076,579 A * 6/2000 Matsumoto
6,079,464 A * 6/2000 Hatakenaka et al.

FOREIGN PATENT DOCUMENTS

| EP | 887209 | * 12/1998 |
|---|---|---|
| JP | 1-115706 | * 5/1989 |
| JP | 1-282005 | * 11/1989 |
| JP | 4-100707 | * 4/1992 |
| JP | 11-286204 | * 10/1999 |

* cited by examiner

Primary Examiner—Steven D. Maki
(74) Attorney, Agent, or Firm—Birch, Stewart, Kolasch & Birch, LLP

(57) ABSTRACT

A pneumatic tire comprises a tread portion provided with a longitudinal main groove extending continuously in the tire circumferential direction and axial grooves each having at least one opening into the longitudinal main groove, and at least one of two groove walls of each of the axial grooves swells gradually towards the opening. The axial grooves include a groove having two openings and/or a groove having one opening and one closed end. The swelling part of the groove wall can be formed by a convexly curved surface extending from the tread surface towards the groove bottom, and having a single radius of curvature gradually decreasing towards the opening.

7 Claims, 4 Drawing Sheets

PNEUMATIC TIRE INCLUDING AXIAL GROOVES

The present invention relates to a pneumatic tire, more particularly to an improved axial groove structure which is capable of reducing uneven tread wear.

In pneumatic tires for heavy duty use such as truck/bus tires, in order to improve wet performance, snow performance and the like, block patters and block base tread patterns are widely used in recent years. In comparison with a rib, such a block is liable to wear unevenly at the heel edge & toe edge in particular (heel & toe wear). Hitherto, therefore, in order to prevent uneven wear, it has been usually employed to partially decrease the depths of tread grooves and/or to chamfer blocks' corners. These measures however inevitably deteriorate the drainage performance, traction or road grip and the like.

It is therefore, an object of the present invention to provide a pneumatic tire, in which uneven wear can be effectively reduced without deteriorating the drainage performance, traction and the like.

According to the present invention, a pneumatic tire comprises a tread portion provided with at least one longitudinal main groove extending continuously in the tire circumferential direction and axial grooves each having at least one opening into the longitudinal main groove, and at least one of two groove walls of each of the axial grooves gradually swelling towards the at least one opening.

An embodiment of the present invention will now be described in detail in conjunction with the accompanying drawings.

Figure 1:
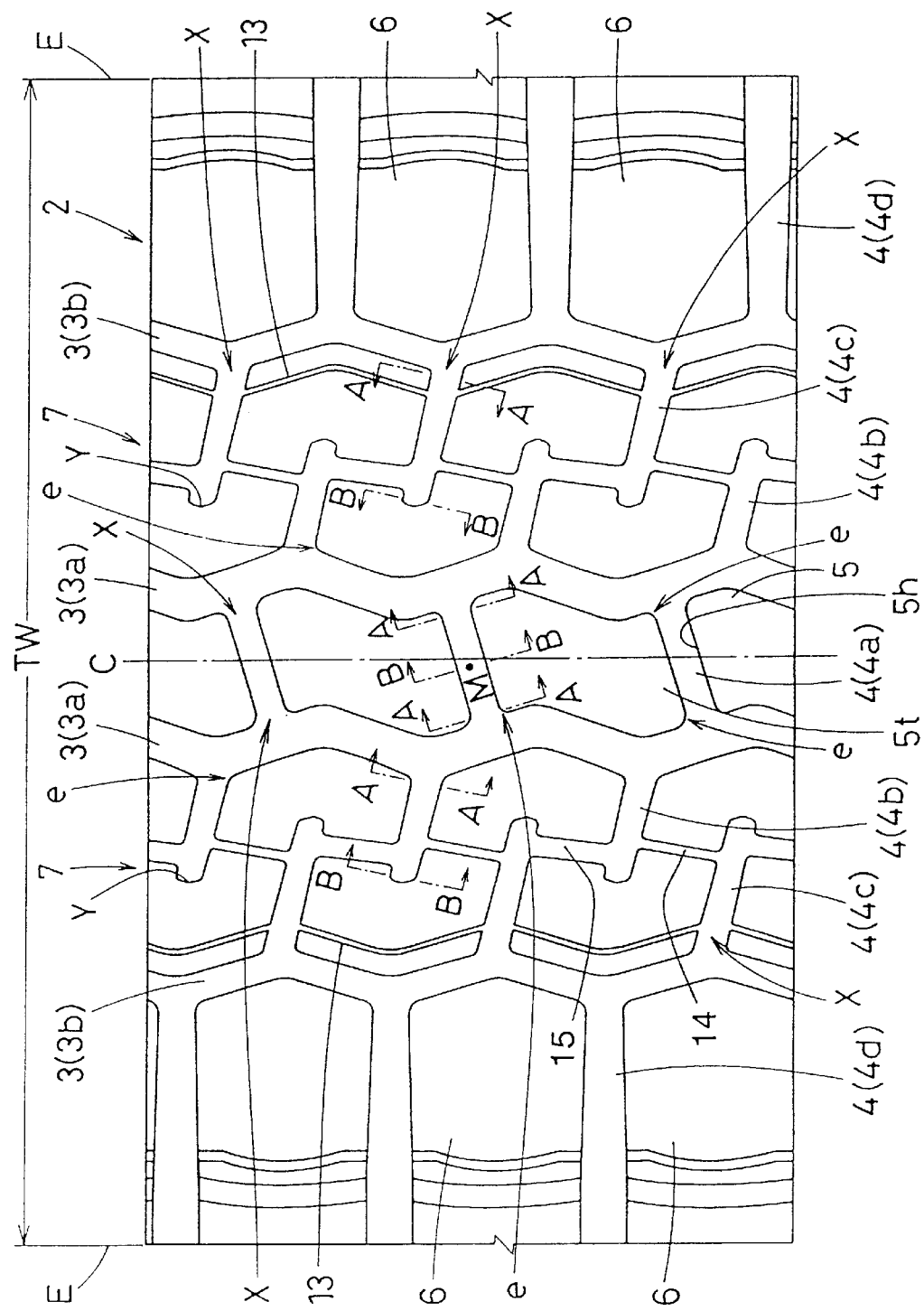
FIG. 1 is a tread pattern according to the present invention.

In this embodiment, the pneumatic tire is a heavy duty radial tire for trucks and buses and has a block pattern.

The pneumatic tire comprises a tread portion, a pair of axially spaced bead portions and a pair of sidewall portions, and as usual it is reinforced by a carcass, a belt and the like.

The tread portion 2 is provided with at least one longitudinal main grooves 3 extending continuously in the tire circumferential direction, and axial grooves 4 extending therefrom.

The longitudinal main grooves 3 have a groove width of not less than 2.5%, preferably not less than 3% of the ground contacting width TW and a groove depth of from 6 to 12% of the ground contacting width TW. In case of truck/bus tires, the width is preferably at least 6 mm.

The axial grooves 4 have a groove width of not less than 2.0% of the ground contacting width TW and a groove depth of from 2 to 12% of the ground contacting width TW.

Here, the ground contacting width TW is defined as the axial distance between the tread edges E, that is, the axially outermost edges E of the ground contacting region under such a condition that the tire is mounted on a standard rim and inflated to a standard pressure, and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, 70% of the "Load Capacity" in ETRTO, the maximum value given in the above-mentioned table in TRA or the like.

Preferably, the number of the longitudinal main grooves 3 is three or more. In this example, the longitudinal main grooves 3 include a pair of axially inner grooves 3a disposed one on each side of the tire equator C and a pair of axially outer grooves 3b disposed axially outside the inner grooves 3a.

Each of the longitudinal main grooves 3 in this example is a zigzag groove. However, various grooves, e.g. a straight groove, sine-curve groove and the like may be used.

The axial grooves 4 include: first axial grooves 4a extending between the two inner main grooves 3a; second axial grooves 4b extending axially outwardly from the inner main grooves 3a and terminating before the outer main grooves 3b; third axial grooves 4c extending axially inwardly from the outer main grooves 3b and terminating before the inner main grooves 3a; and fourth axial grooves 4d extending axially outwardly from the outer main grooves 3b and opened at the tread edges E. Thus, the axial grooves 4 include ones having two open ends and ones having an open end and a closed end. That is, each of the first axial grooves 4a has an opening X into the main groove 3a at each end thereof, each of the second and third axial grooves 4b and 4c has an opening X into the main groove 3a, 3b at one end thereof and a closed end Y on the other side, each of the fourth axial grooves 4d has an opening X into the main groove 3b at the axially inner end thereof and an opening into the axially outside of the tire.

By the longitudinal main grooves 3 and axial grooves 4, the tread portion 2 is divided into a number of blocks, which, in this example, include central blocks 5 between the axially inner main grooves 3a, and shoulder blocks 6 between the axially outer main grooves 3b and tread edges .E.

The portions 7 between the axially inner main grooves 3a and axially outer main grooves 3b have circumferential continuity if grooves other than the main grooves 3 and axial grooves 4 are not provided. In this example, however, these portions 7 are subdivided into middle blocks by narrow grooves 13 parallel with the axially outer main grooves 3b and alternate narrow grooves 14 and wide grooves 15 which are disposed between the narrow groove 13 and the axially inner main groove 3a and each of which extends between the circumferentially adjacent second axial groove 4b and third axial groove 4c.

Figure 2A:
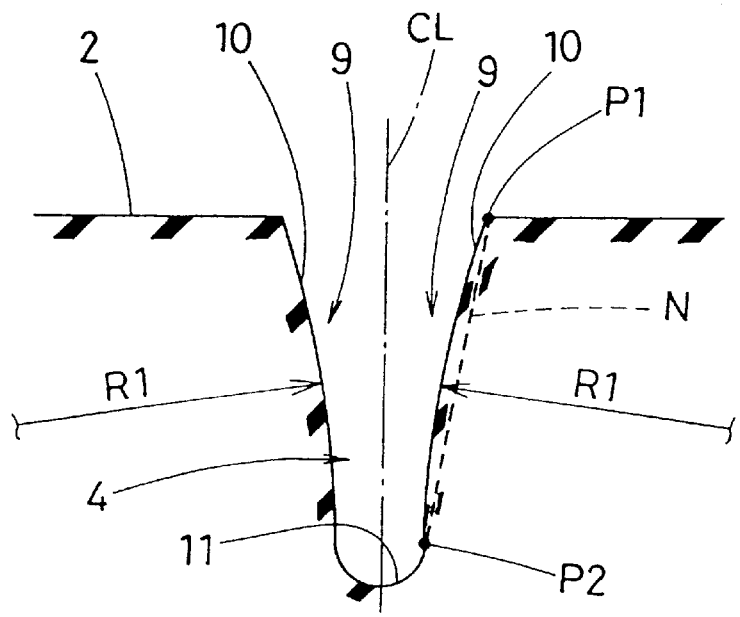
FIG. 2(A) is a cross sectional view of the axial groove taken along the line A—A of FIG. 1.
Figure 2B:
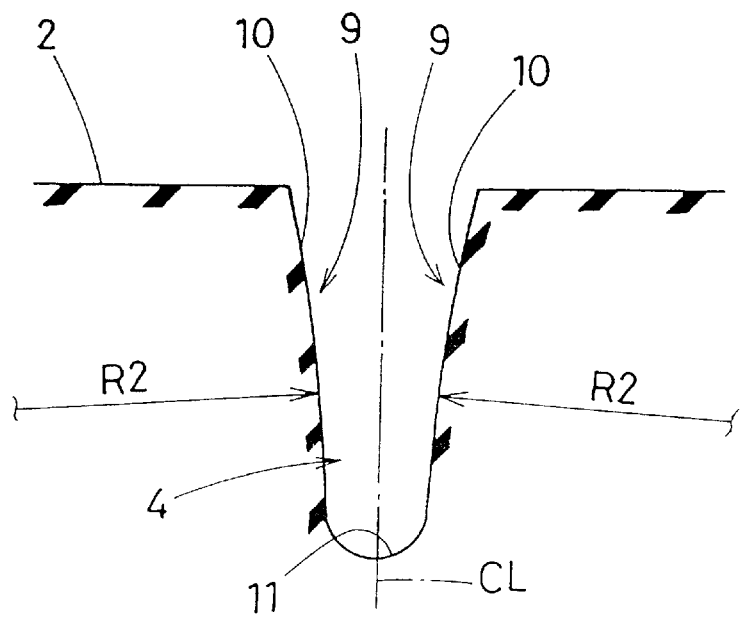
FIG. 2(B) is a cross sectional view of the axial groove taken along the line B—B of FIG. 1.

According to the present invention, at least one, in this example both of the groove walls 9 of each axial groove 4 swell gradually towards the opening X. FIGS. 2(A) and 2(B) show cross sections of an axial groove at different positions. Here, the cross section is normal to the longitudinal direction of the axial groove 4.

Figure 3:
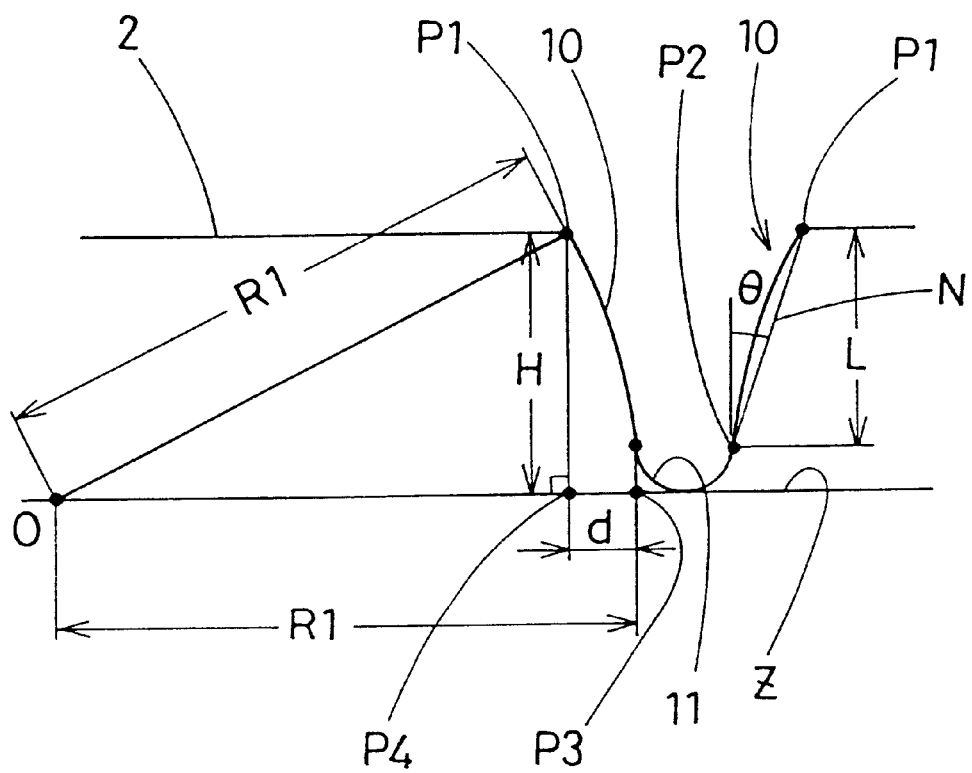
FIG. 3 is a cross sectional view of the axial groove for explaining the curved surface of the swelling part.

As shown in FIG. 3, the swelling part 10 is defined by a convex curve extending from the tread surface to a certain depth L. The depth L is set in the range of not less than 60%, preferably not less than 70%, more preferably 70 to 90% of the groove depth H of the axial groove 4. In the cross section, the convex curve has a single radius R which gradually decreases towards the opening X. The radius R is set in the range of not more than 1.4 times, preferably not more than 1.0 times, more preferably not more than 0.6 times the ground contacting width TW. In this embodiment, further, the groove bottom defined as extending between the radially inner ends P2 of the convex curves of the two groove walls is formed by a concave curve having a single radius and connected to the above-mentioned convex curves without an inflection point.

In case of the axial groove having two openings, the radius of curvature becomes a maximum value Rmax in the middle M of the length and a smaller value Ro at each of the openings X. In case of the axial groove having one opening and one closed end, the radius of curvature becomes a maximum value Rmax at the closed end Y and a minimum value Ro at the opening X. The ratio Rmax/Ro is set in the range of from 1.5 to 5.0, preferably 2.0 to 4.0, more preferably 2.0 to 3.0. The changing from Rmax to Ro is made at a substantially constant rate.

In this embodiment, as shown in FIG. 3, the center O of the curvature is set on a groove bottom line Z which is a tangent to the groove bottom.

A straight line N which is drawn between the radially outer edge P1 and the radially inner edge P2 of the curved surface of the swelling part 10 is inclined at an angle $\theta$ of from 3 to 13 degrees, preferably 5 to 11 degrees with respect to the normal direction to the tread surface towards such a direction that the groove width increases towards the tread surface. Further, between the curved surface and the top surface of the block, an angled corner is formed, and the angle thereof is preferably set in the range of from 90 to 110 degrees. Furthermore, the above-mentioned radius Ro is preferably set to satisfy the following condition $$Ro \leq (H^2+d^2)/2d$$

wherein, H is the depth of the axial groove, and d is the distance between points P3 and P4 on the groove bottom line Z, the points P3 and P4 are projections of the points P2 and P1, respectively. Incidentally, the measurement is made under a condition that the tire is mounted on the standard rim and inflated to the standard rim but loaded with no tire load.

In this embodiment, the cross sectional shape of the axial groove is symmetric about the groove center. But it is not always necessary. It is possible to change the radius of curvature between the two groove walls of a groove.

Comparison Test

Truck/bus radial tires of size 11R22.5 14PR (rim size 22.5×7.50) having the same structure and the same tread pattern shown in FIG. 1 except for the sectional shape of the axial grooves were made and tested for uneven wear.

The test tires (pressure 700 kPa) were run for 20000 km using a 2-D4 wheel type truck and then the tread portion was checked for uneven wear at the side edges, heel edges and toe edges of the blocks. The results are indicated in Table 1 by an index base on Ref.2 being 100, wherein the larger the index, the better the uneven wear.

TABLE 1

Figure 4A:
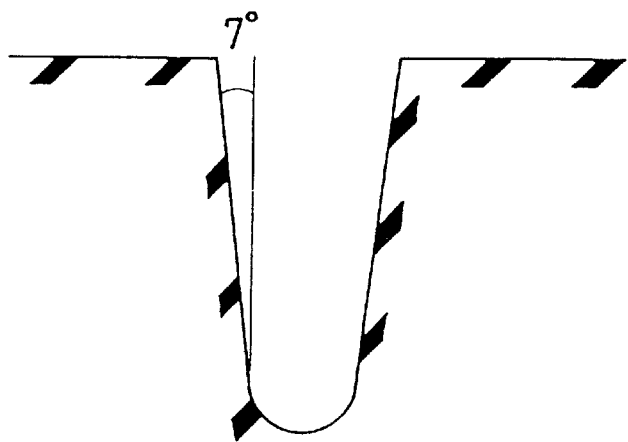
FIG. 4(A) is a cross sectional view of the axial groove used in comparison test (Ref.1).

| Tire | Ref. 1 | Ref. 2 | Ref. 3 | Ex. 1 | Ex. 2 | Ex. 3 |
|---|---|---|---|---|---|---|
| Axial grooves | FIG. 4 (A) | FIG. 4 (B) | FIG. 2 (A) | FIG. 2 (A, B) | FIG. 2 (A, B) | FIG. 2 (A, B) |
| Swelling part | | | | | | |
| Radius Ro (mm) | — | — | 120 | 60 | 60 | 60 |
| Radius Rmax (mm) | — | — | 120 | 120 | 180 | 240 |
| Ro/Rmax | — | — | 1 | 2 | 3 | 4 |

TABLE 1-continued

| Uneven wear | | | | | | |
|---|---|---|---|---|---|---|
| Central block | 88 | 100 | 103 | 120 | 116 | 108 |
| Middle block | 90 | 100 | 102 | 118 | 112 | 107 |

Figure 4B:
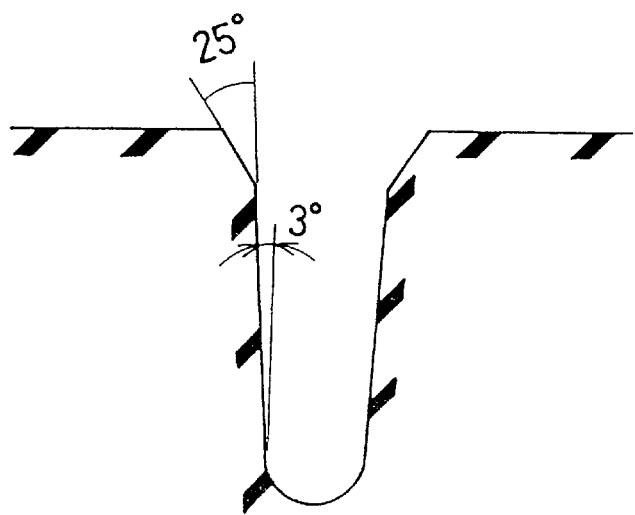
FIG. 4(B) is a cross sectional view of the axial groove used in comparison test (Ref.2).

The axial grooves of Ref.2 had the sectional shape shown in FIG. 4(B) along the length. The axial grooves of Ref.1 had the sectional shape shown in FIG. 4(A) along the length. The axial grooves of Ref.3 had the sectional shape shown in FIG. 2(A) along the length (the radius was constant). In all the test tires, the width of the axial grooves was 5.5 mm, the width of the axially inner longitudinal main grooves 3a was 8.0 mm, and the width of the axially outer longitudinal main grooves 3b was 6.0 mm.

From the test results, it was confirmed that uneven wear of the example tires according to the present invention can be effectively controlled.

The present invention can be suitably applied to heavy duty tires. But, it is also possible to apply the invention to passenger car tires, motorcycle tires and the like.

What is claimed is:

1. A pneumatic tire comprising a tread portion provided with
   at least one longitudinal main groove extending continuously in the tire circumferential direction, and
   axial grooves each having at least one opening into said at least one longitudinal main groove, wherein
      at least one of two groove walls of each of the axial grooves gradually swells towards said at least one opening,
      in a cross section of the axial groove, the swelling part of the groove wall has a convexly curved surface extending from the tread surface to a depth L in the range of not less than 60% of the depth H of the axial groove, and
      said convexly curved surface has a radius of curvature gradually decreasing towards said at least one opening.

2. The pneumatic tire according to claim 1, wherein
   said axial grooves include axial grooves each having the opening and a closed end on the other side of the opening and at least one of two groove walls thereof swelling gradually from the closed end to the opening.

3. The pneumatic tire according to claim 1, wherein
   said at least one longitudinal main groove is at least two longitudinal main grooves,
   said axial grooves include axial grooves each of which has two openings into said at least two longitudinal main grooves and of which at least one of two groove walls swells gradually from the middle of the groove length towards both of the two openings.

4. The pneumatic tire according to claim 1, wherein
   said at least one longitudinal main groove is at least two longitudinal main grooves,
   said axial grooves include
      axial grooves each of which has two openings into said at least two longitudinal main grooves and of which at least one of two groove walls swells gradually from the middle of the groove length towards both of the two openings, and
      axial grooves each having one opening into one of said at least two longitudinal main grooves and a closed end on the other side of the opening and of which at least one of two groove walls swells gradually from the closed end to the opening.

5. The pneumatic tire according to claim 1, wherein
in said cross section of the axial groove, a straight line which is drawn between the radially outer edge P1 and the radially inner edge P2 of the curved surface is inclined at an angle of from 3 to 13 degrees with respect to the normal direction to the tread surface towards such a direction that the groove width increases towards the radially outside of the tire.

6. The pneumatic tire according to claim 1, wherein
a ratio Rmax/Ro of a radius of Ro of curvature of the convexly curved surface at the opening and the maximum Rmax of the radius of curvature of said convexly curved surface is in the range of from 1.5 to 5.0.

7. The pneumatic tire according to claim 1, wherein
the depth H of the axial groove, a radius Ro of curvature of the convexly curved surface at the opening, and a distance d between the radially outer edge and the radially inner edge of the curved surface measured in the widthwise direction of the axial groove satisfy $Ro \geq (H^2+d^2)/2d$.

* * * * *